United States Patent Office 3,832,257
Patented Aug. 27, 1974

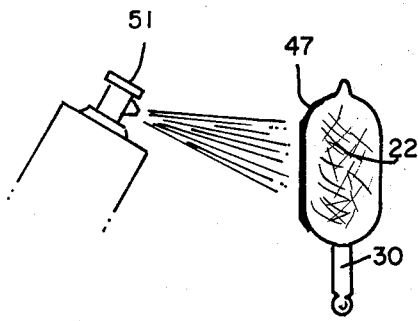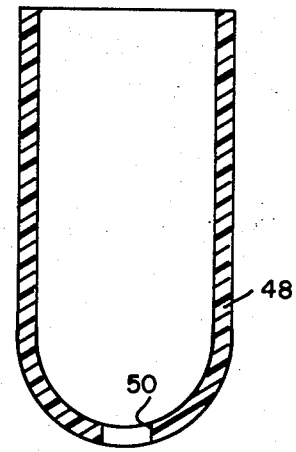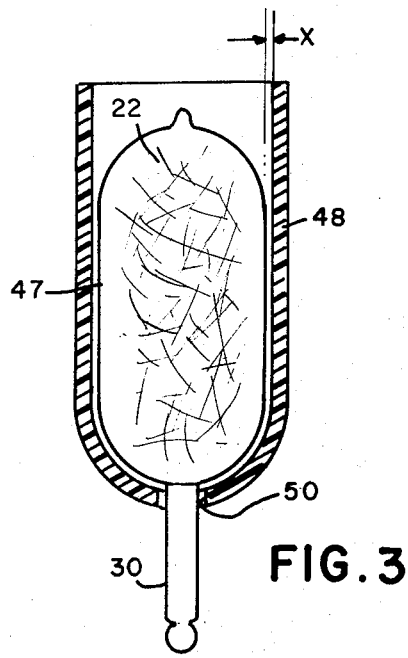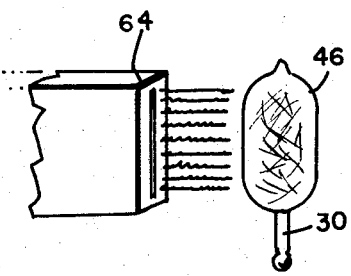

3,832,257
METHOD OF COATING PHOTOFLASH LAMP
Warren H. Hay, South Hamilton, Mass., assignor to GTE Sylvania Incorporated
Filed Sept. 15, 1972, Ser. No. 289,446
Int. Cl. B29c 17/00
U.S. Cl. 156—198
14 Claims

ABSTRACT OF THE DISCLOSURE

A method of coating the glass envelope of a photoflash lamp with a thermoplastic material, the method comprising: applying a thin film of mold release on the exterior surface of the glass envelope; locating the film coated glass envolpe in a dried, preformed sleeve of thermoplastic material; drawing a vaccum in the space between the sleeve and the envelope; heating the assembly incrementally lengthwise to gradually form the sleeve onto the envolpe; constricting and tipping off the sleeve at the conclusion of the heating process; and after the glass and thermoplastic have cooled, heating a narrow band of the thermoplastic coating longitudinally and/or circumferentially to relieve the stresses in the thermoplastic coating and thereby predictably control the compressive loading on the glass envelope of the lamp.

BACKGROUND OF THE INVENTION

This invention relates to photoflash lamps and, more particularly, to an improved method for applying a vacuum formed thermoplastic coating on the glass envelope of a flash lamp.

A typical photoflash lamp comprises a hermetically sealed glass envelope, a quantity of combustible material located in the envelope, such as shredded zirconium or hafnium foil, and a combustion-supporting gas, such as oxygen, at a pressure well above 1 atmosphere. The lamp also includes an electrically or percussively activated primer for igniting the combustible to flash the lamp. During lamp flashing, the glass envelope is subject to severe thermal shock due to hot globules of metal oxide impinging on the walls of the lamp. As a result, cracks and crazes occur in the glass and, at higher internal pressures, containment becomes impossible. In order to reinforce the glass envelope and improve its containment capability, it has been common practice to apply a protective lacquer coating on the lamp envelope by means of a dip process. To build up the desired coating thickness, the glass envelope is generally dipped a number of times into a lacquer solution containing a solvent and a selected resin, typically cellulose acetate. After each dip, the lamp is dried to evaporate the solvent and leave the desired coating of cellulose acetate or whatever other plastic resin is employed.

In the continuing effort to improve light output, higher performance flash lamps have been developed which contain higher combustible fill weights per unit of internal envelope volume, along with higher fill gas pressures. In addition, the combustible material may be one that reaches a higher combustion temperature, such as hafnium. Such lamps, upon flashing, appear to subject the glass envelopes to more intense thermal shock effects, and thus require stronger containment vessels. One approach to this problem has been to employ a hard glass envelope, such as the borosilicate glass envelope described in U.S. Pat. 2,506,385, along with a protective dip coating, Although providing some degree of improvement in the containment capability of lamp envelopes, the use of dip coatings and hard glass present significant disadvantages in the areas of manufacturing cost and safety.

To overcome these disadvantages, a more economical and significantly improved containment vessel for flash lamps as described in a copending application Ser. No. 268,576, filed July 3, 1972 and assigned to the assignee of the present application. According to this previously filed application, a thermoplastic coating, such as polycarbonate, is vacuum formed onto the exterior surface of the glass envelope. The method of applying the coating comprises: placing the glass envelope within a preformed sleeve of thermoplastic meterial; drawing a vacuum in the space between the thermoplastic sleeve and the glass envelope; and simultaneously heating the assembly incrementally along its length, whereby the temperature and vacuum cause the thermoplastic to be incrementally formed onto the glass envelope with the interface substantially free of voids, inclusions and the like. This method provides an optically clear protective coating by means of a significantly faster, safer and more economical manufacturing process which may be easily integrated on automated production machinery. The process permits use of stronger more temperature resistant thermoplastics, and the resulting coating maintains the glass substrate under a compressive load, thereby making the glass envelope itself more resistant to failure. As a result, this coating reduces the cost of materials by permitting the use of soft glass to meet high containment requirements.

The thermoplastic material has a coefficient of thermal expansion several times greater than the coefficient of thermal expansion of the glass envelope. Hence, as the thermoplastic coating cools from the softening temperature subsequent to vacuum forming, it will exert a compressive load on the envelope to thereby in effect strengthen the glass. For example, the thermoplastic coating may exert a compressive load of from 1,000 to about 4,000 pounds per square inch on the glass envelope. Although the glass becomes stronger with a higher compressive loading, an increase in the compressive loading on the glass results in a corresponding increase in the tensile loading on the coating. Typically, these tension stresses in the coating may be approximately 2000 to 3000 pounds per square inch. In itself, this loading may be acceptable if uniform throughout the coating. In actual practice however higher localized stresses appear to develop, probably due to irregularities in the glass, friction between the plastic and glass, and irregularities on the inner surface of the plastic.

In order to relieve these local points of high stress and provide a more uniform compressive loading on the glass envelope, a copending application Ser. No. 287,724 assigned to the assignee of the present application, describes the use of a thin layer of mold release between the glass and thermoplastic material. The mold release agent appears to lubricate the glass-plastic interface and permit the adjacent surfaces to slide over one another, thereby tending to equalize the stresses.

It is also desirable, however, to predictably control the compressive loadings on the glass, i.e., the average level of the stresses remaining after the thermoplastic has been vacuum-formed onto the glass envelope of the lamp and cooled. Previous attempts at relieving the compressive loading have included the use of a small amount of plasticizer or a filler in the composition of the thermoplastic for the purpose of altering the thermal expansion coefficient. In certain of the thermoplastics particularly suitable for this application, however, it has been found difficult to control this use of a plasticizer or filler so as to avoid producing adverse effects on the clarity and strength of the plastic.

SUMMARY OF THE INVENTION

In view of the foregoing, it is an object of this invention to provide an improved method for coating the glass envelope of a photoflash lamp with a thermoplastic material.

It is a particular object of the invention to provide a method of vacuum-forming a thermoplastic coating on the glass envelope of a photoflash lamp with improved control over the level of compressive loading on the glass.

These and other objects, advantages and features are attained in accordance with the invention, by a method comprising: applying a thin film coating of mold release agent on the exterior surface of the glass envelope of the lamp; placing the film-coated glass envelope within a preformed sleeve of thermoplastic material; drawing a vacuum in the space between the thermoplastic sleeve and the film coated glass envelope; and, simultaneously heating the assembly incrementally along its length, whereby the temperature and vacuum cause the thermoplastic to be incrementally formed onto the film coated glass envelope; then after the glass and thermoplastic have cooled, heating a narrow area of the thermoplastic coating longitudinally from end to end and/or circumferentially around the lamp envelope to reduce the stresses in the thermoplastic coating.

BRIEF DESCRIPTION OF THE DRAWINGS

This invention will be more fully described hereinafter in conjunction with the accompanying drawings, in which:

FIG. 1 illustrates the step of spraying a thin film coating of mold release agent on the exterior surface of the glass envelope of a percussive-type photoflash lamp;

FIG. 2 is an enlarged sectional elevation of a preformed sleeve of thermoplastic adapted for assembly and vacuum forming onto the film-coated glass envelope of the lamp of FIG. 1;

FIG. 3 is an enlarged elevation, partly in section, showing a percussive flashlamp assembled in the thermoplastic sleeve of FIG. 2, prior to vacuum forming;

FIG. 7 illustrates the step of heating a narrow longitudinal band of the thermoplastic coating.

DESCRIPTION OF PREFERRED EMBODIMENT

Figure 6:
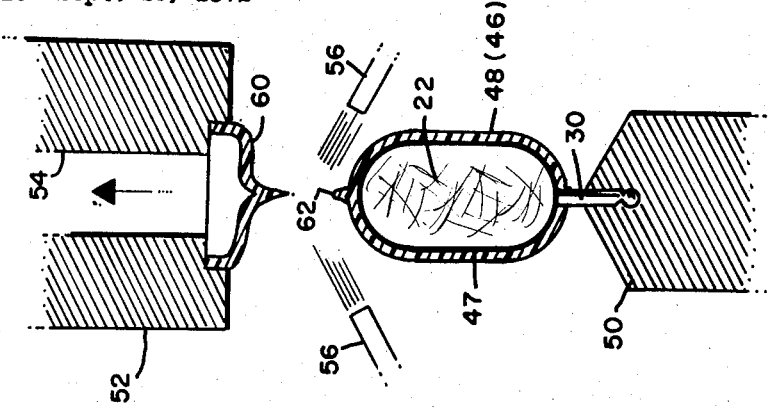
FIG. 6 illustrates the tipping off step carried out by the apparatus of FIG. 4.

The present invention comprises an improvement over the coating method described in the aforementioned copending applications, Ser. Nos. 268,576 and 287,724, and in a like manner its teachings are applicable to either percussive or electrically imgnited photoflash lamps of a wide variety of sizes and shapes. For purposes of example, the method will be described with reference to vacuum forming a thermoplastic coating on a percussive-type photoflash lamp. Briefly, a percussive photoflash lamp comprises a hermetically sealed, light-transmitting envelope 22 formed of a length of glass tubing constricted to a tip at one end thereof and having a primer tube 30 sealed in the other end and coaxially projecting therefrom. The glass envelope 22 contains a combustible, such as shredded zirconium foil, and a combustion-supporting gas, such as oxygen. Coaxially supported within the primer tube 30 is a wire anvil coated with a charge of fulminating material. Operation of the lamp is initiated by an impact on the primer tube 30 to cause deflagration of the fulminating material on the wire anvil up through the tube to ignite the combustible disposed in the lamp envelope.

Referring first to FIG. 2, the thermoplastic material to be coated on the exterior surface of the lamp envelope is initially provided as a preformed sleeve 48 having the shape of a test tube. To facilitate passage of the coaxially projecting primer tube 30, sleeve 48 is provided with a single coaxially disposed hole 50. Sleeve 48 may be formed by a molding or extrusion process, and to minimize possible bubbling in the plastic upon being vacuum formed to the glass envelope, the preformed sleeve 48 should be prebaked at about 125° C. for at least 15 minutes to drive away residual moisture prior to assembly with the glass envelope.

Before assembling the sleeve on the envelope, a thin film coating of a clear mold release agent 47 is applied on the exterior surface of the glass envelope 22. Preferably the release agent 47 is applied by means of an aerosol spray 51, as illustrated in FIG. 1, although other methods of application, such as dipping in a solvent or by agitating in a dry release agent powder may be employed. The material 47 may comprise any lubricating release agent which is clear and substantially inert with respect to the glass envelope 22 and the thermoplastic sleeve 48. A silicone mold release agent has been found to be particularly suitable for this application.

In the next step, shown in FIG. 3, the film coated glass envelope 22 of the percussive lamp is placed within the preformed thermoplastic sleeve 48, with the primer tube 30 projecting through hole 50. It will be noted that both the sleeve 48 and the lamp envelope 22 have generally tubular side walls. To facilitate the vacuum forming process, the fit should be as close as possible. Accordingly, the outside diameter of the tubular envelope 22 and the inside diameter of the tubular sleeve 48 are dimensioned so that, when the envelope is placed within the sleeve, there exists a clearance $x$ of about 0.001 to 0.015 inch between the tubular side walls thereof prior to heating and vacuum forming.

Figure 4:
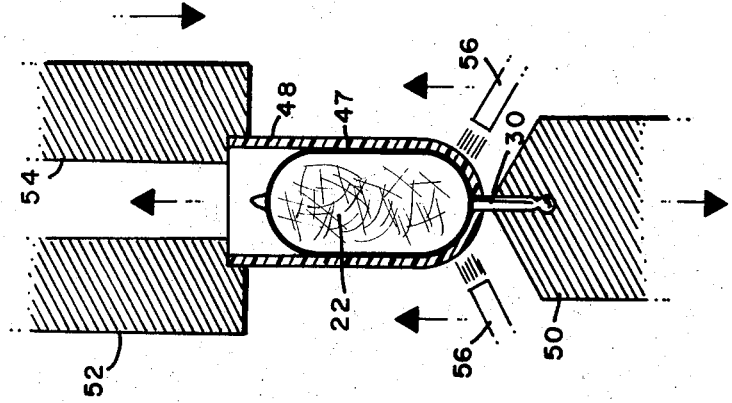
FIG. 4 is a simplified fragmentary elevation, partly in section, of the vacuum forming apparatus, this view illustrating the simultaneous vacuum drawing and heating steps.

The next step, heating and vacuum forming, is illustrated in FIG. 4. The envelope and sleeve assembly 22, 48 is held during the evacuating and heating processes by means of a chuck 50 gripping the primer tube 30. Another chuck 52 having an evacuating tube 54, grips the open end of the thermoplastic sleeve 48. One or more localized sources of heat, represented by heaters 56, encircle the envelope and sleeve assembly for uniformly applying heat about the tubular sleeve in a substantially localized elevational plane. In operation, the process comprises drawing a vacuum in the space between the sleeve 48 and the envelope 22, while simultaneously heating the envelope and sleeve assembly incrementally along its length. More specifically, the vacuum is drawn through tube 54, in the direction of the arrow, at the open end of sleeve 48. At the same time the heaters 56 are controlled to heat the sleeve to approximately the softening temperature of the thermoplastic material. A relative incremental axial movement is effected between the envelope-sleeve assembly and the heaters, so that incremental heating in a localized elevational plane starts at the end of the sleeve 48 through which the primer tube 30 projects and then proceeds toward the open end of the sleeve from which the vacuum is being drawn. In this manner, the temperature and vacuum cause the thermoplastic sleeve to be formed onto the film coated glass envelope 22 with the interface therebetween substantially free of air voids, inclusions and the like.

Referring to FIG. 4, this incremental heating process may be accomplished at one station by either moving the chucks 50 and 52 downward with respect to a set of stationary heaters 56, or by moving the heaters 56 upward with respect to a set of stationary chucks 50 and 52. A preferred method effecting the incremental heating, however, is to index the envelope-sleeve assembly through a plurality of heating stations, with the heaters at each station positioned at successively higher elevations.

Figure 5:
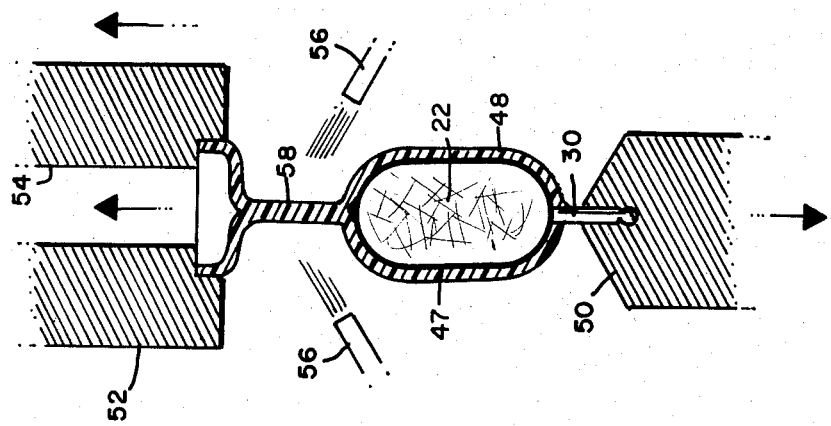
FIG. 5 illustrates the constricting step carried out by the apparatus of FIG. 4.

At the conclusion of the incremental heating process, the sleeve 48 is constricted at portion 58, as shown in FIG. 5, by slowly pulling chucks 50 and 52 away from each other, while continuing to apply heat and draw a vacuum. Next, as shown in FIG. 6, the vacuum formed sleeve 48 on the lamp is separated from the portion 60 of the sleeve held in chuck 52 and tipped off at point 62, thereby completely encapsulating the glass envelope 22 in the thermoplastic coating 46.

After the glass and thermoplastic coating have cooled substantially from the temperature necessary to vacuum form the thermoplastic sleeve, a narrow area of the thermoplastic coating 46 is heated longitudinally from end to end. Preferably, the width of the heated band of thermoplastic is about one-eighth of an inch or less. The heating must be done rapidly so that the main area of the thermoplastic and glass remains cool. The temperature that must be reached is approximately 300° F. As illustrated in FIG. 7, this selective method of heating the coated lamp may be provided by a jet of hot air from a long narrow orifice 64. Alternatively, instead of heating by conduction with hot air, radiant energy from an electrically heated wire suitably shielded and bent to conform to the contour of the area to be heated may also be used.

If we think of the vacuum formed thermoplastic coating and the glass envelope as being under hoop stress and axial stress loadings, this localized heating over a narrow longitudinal band of the thermoplastic in combination with the interface lubricating qualities of the mold release agent 47 functions to relieve the hoop stress. More specifically, the localized heating momentarily expands a narrow longitudinal band of the thermoplastic coating, and the mold release agent permits the thermoplastic to move over the glass and thereby relieve the hoop stress loading. Further stress relief may be provided by heating a second longitudinal band of the thermoplastic diametrically opposite the first heated band and subsequent to the cooling thereof.

After the glass envelope and coating have again cooled, one or more jets of hot air or a heating wire may be employed to heat a narrow band of the plastic coating circumferentially around the bulb. In this instance, the resulting momentary expansion of a narrow circumferential band of the thermoplastic coating causes the coating to move over the glass in a manner which relieves the axial stresses.

Of course, in lieu of the above sequence, the circumferential heating may be performed prior to the longitudinal heating step but after tipping off the coating.

An alternative method which may be employed to relieve the axial stresses is the following process. At the conclusion of the incremental heating process illustrated in FIG. 4, the heat sources 56 are removed just as they reach the top shoulder of the lamp envelope 22 (a heater 56 positioned slightly below that shown in FIG. 5). The thermoplastic sleeve and glass are then allowed to cool, and during the resulting contraction of the materials, the sleeve moves with respect to the glass to relieve axial tensions. After this cooling period of controlled duration, the heat sources 56 are reapplied and the process is continued to constrict the sleeve 48 as shown in FIG. 5 and then to tip off the thermoplastic as shown in FIG. 6. The encapsulation process is then completed after the localized longitudinal heating to relieve hoop stresses.

The composition of sleeve 48, and thus coating 46, may be of any vacuum formable light-transmitting thermoplastic material having a reasonably high impact strength and softening temperature. Suitable materials include acrylic, acrylonitrile-butadiene-styrene, cellulose acetate, ionomers, methylpentene polymer, nylon, polycarbonate, polystyrene, polysulfone, or alloys thereof. Commercial dyes can be used in the sleeve for color corrections desirable with various photographic color film.

As described in the aforementioned copending applications, the thermoplastic material has a coefficient of thermal expansion several times greater than the coefficient of thermal expansion of the glass envelope. In this manner the coating 46 provided by the above-described vacuum forming process will exert a compressive load on the glass envelope to thereby in effect strengthen the glass and make it more resistant to the effects of thermal shock and impact. For example, with a coefficient of thermal expansion at least six times greater than that for the glass, the thermoplastic coating (in the absence of the above described longitudinal and circumferential stress relief procedures) may exert a compressive load of from about 1000 to about 4000 pounds per square inch on the glass envelope.

The added containment strength provided by this compressive loading may be better understood by briefly considering the effects of the combustion process. Upon flashing the lamp and igniting the shreds of combustible, the inner surface of the glass envelope is subjected to severe thermal shock in the form of impact from hot globules of metal oxide; for example, zirconium oxide has a melting point of 2715° C. Each thermal impact against the internal glass surface produces a thermal stress gradient through the wall of the glass envelope, which serves as an insulator to the conducted heat and causes expansion in the glass. Any thermoplastic coating on the glass will be under tension ($T_D$) and there will be a localized tensile stress ($T_X$) at the interface of the coating and glass, opposite the point of globule impact. The build up of the localized tensile stress ($T_X$) by the thermal stress gradient is what can eventually cause a crack through the glass wall. On the other hand, the compression loading (C) which is exerted on the glass envelope by the coating functions to counteract the tensile loading of $T_D$ and $T_X$ by delaying the thermal stress gradient through the glass wall; this may be illustrated as $T_D+T_X-C$. Accordingly, the higher the compressive loading, the stronger the glass. Also, however, an increase in the compressive loading on the glass results in a corresponding increase in the tensile loading on the coating. Hence a compressive load that is too high can be detrimental to the thermoplastic. Accordingly, the present invention provides methods for relieving the hoop and axial stresses in the coating to thereby predictably control the compressive loading on the glass.

In one typical embodiment of the invention, a percussive flashlamp of the type described was provided with a clear vacuum-formed coating 46 of polycarbonate resin having a wall thickness of about 0.020 inch. The lamp contained a combustible fill 36 comprising 19.5 mgs. of shredded zirconium foil and oxygen at a fill pressure of 8 atmospheres. The tubular envelope 22 was formed of G-1 type soft glass and had a nominal outside diameter of 0.325 inch. In the process of coating the lamp, an injection molded sleeve 48 of clear polycarbonate resin having a nominal inside diameter of 0.340 inch and a wall thickness of 0.020 was employed. Before placing the lamp in the sleeve, the glass envelope 22 was sprayed with a silicone mold release agent. During vacuum forming, the molded sleeve was incrementally heated to a temperature of about 400° F. by a stream of nitrogen heated by a serpentine heater. The coefficient of thermal expansion of soft glass of this type ranges from 85 to $95 \times 10^{-7}$ in./in./° C. between 20° and 300° C., whereas the coefficient of thermal expansion of unfilled polycarbonate between 25° and 140° C. is about $660 \times 10^{-7}$ in./in./° C. The axial stresses in the coating were relieved by the alternative method described above, wherein the incremental heating is stopped at the top shoulder of the lamp envelope to permit a momentary cooling of the coating and glass. At the end of the process, the hoop stresses in the coating were relieved by momentarily directing a fine jet of heated air against the thermoplastic in two successive steps to sequentially heat the coated envelope along two diametrically disposed longitudinal bands of about one-eighth inch in width; the temperature that must be reached is approximately 300° F. Upon measuring several sections of lamps made as described above, the average compressive stress exerted by the coating 46 upon the glass envelope 22 was found to be about 700 to 900 pounds per square inch. Without stress relief, the coated glass had an average compressive loading of from 1400 to 2000 pounds per square inch.

Although the invention has been described with respect to specific embodiments, it will be appreciated that modifications and changes may be made by those skilled in the art without departing from the true spirit and scope of the invention. For example, instead of applying the silicone mold release agent 47 to the exterior surface of the lamp envelope 22, the same results can be achieved by spraying or otherwise applying the mold release agent on the interior surface of the preformed thermoplastic sleeve 48. This step could occur after the step of prebaking the sleeve but before assembling the glass envelope within the sleeve.

What I claim is:

1. A method of coating the glass envelope of a photoflash lamp with a thermoplastic material, said method comprising:
    applying a thin film coating of mold release agent on the exterior surface of said glass envelope,
    placing said film coated glass envelope within a preformed sleeve of said thermoplastic material;
    drawing a vacuum in the space between said thermoplastic sleeve and said film coated glass envelope, while simultaneously heating said sleeve and envelope assembly incrementally along the length thereof, whereby the temperature and vacuum cause said thermoplastic sleeve to be incrementally formed onto said glass envelope,
    allowing said thermoplastic coated lamp to cool, and thereafter
    momentarily heating said thermoplastic coated lamp over a narrow longitudinally extending area thereof to relieve stresses in said thermoplastic material.

2. The method of claim 1 wherein said incremental heating is applied uniformly about said sleeve and envelope assembly by one or more localized sources of heat encircling said assembly, and said assembly is indexed through a plurality of heating stations, each of which has said one or more localized sources of heat positioned at successively higher elevations.

3. The method of claim 1 including the further step of prebaking said thermoplastic sleeve to remove the moisture therefrom prior to assembling said sleeve with said film coated glass envelope.

4. The method of claim 1 including the further step of constricting and tipping off said vacuum formed sleeve at the conclusion of said incremental heating process and before allowing said lamp to cool prior to said momentary heating step.

5. The method of claim 4 including the further step of allowing said thermoplastic coated lamp to cool for a moment near the conclusion of said incremental heating process and before the steps of constricting and tipping off, to thereby relieve stresses in said thermoplastic material.

6. The method of claim 5 including the further steps of allowing said thermoplastic coated lamp to cool after said first momentary longitudinal heating step, and then momentarily heating said thermoplastic coated lamp over a second narrow longitudinally extending area thereof diametrically opposite said first longitudinally heated area.

7. The method of claim 1 including the further steps of allowing said thermoplastic coated lamp to cool after said first momentary longitudinal heating step, and then momentarily heating said thermoplastic coated lamp over a second narrow longitudinally extending area thereof diametrically opposite said first longitudinally heated area.

8. The method of claim 1 wherein both said thermoplastic sleeve and said glass envelope have generally tubular sidewalls, and the outside diameter of said tubular envelope and inside diameter of said tubular sleeve are dimensioned so that, when said envelope is placed within said sleeve, there exists a clearance of from about 0.001 to 0.015 inch between the tubular sidewalls thereof prior to heating.

9. The method of claim 1 wherein said release agent is a silicone material.

10. The method of claim 1 wherein said release agent is applied by spraying it onto the exterior surface of said glass envelope.

11. The method of claim 1 wherein said momentary longitudinal heating of said thermoplastic coated lamp for providing stress relief is performed at a temperature of at least approximately 300° F.

12. The method of claim 1 wherein the area of said thermoplastic coated lamp which is momentarily heated for providing stress relief extends in a narrow band longitudinally from one end of the lamp envelope to the other, said heated band having a width of about one-eighth inch or less.

13. The method of claim 1 including the further steps of allowing said thermoplastic coated lamp to cool after said momentary longitudinal heating step, and then momentarily heating said thermoplastic coated lamp over a narrow circumferential area around the lamp to relieve stresses in said thermoplastic material.

14. A method of coating the glass envelope of a photoflash lamp with a thermoplastic material, said method comprising:
    applying a thin film coating of mold release agent on the interior surface of a preformed sleeve of said thermoplastic material,
    placing said glass envelope within said interiorly coated sleeve of thermoplastic material,
    drawing a vacuum in the space between said interiorly coated thermoplastic sleeve and said glass envelope, while simultaneously heating said sleeve and envelope assembly incrementally along the length thereof, whereby the temperature and vacuum cause said interiorly coated thermoplastic sleeve to be incrementally formed onto said glass envelope,
    allowing said thermoplastic coated lamp to cool, and thereafter
    momentarily heating said thermoplastic coated lamp over a narrow longitudinally extending area thereof to relieve stresses in said thermoplastic material.

References Cited

UNITED STATES PATENTS

| 2,686,337 | 8/1954 | Kaufman | 156—294 |
| 3,673,040 | 6/1972 | Hill | 156—294 |
| 3,025,201 | 3/1962 | Ponemon | 156—294 |
| 2,639,213 | 5/1953 | Barth | 117—5.1 |
| 2,452,607 | 11/1948 | Slaughter | 156—86 |
| 2,857,752 | 10/1958 | Anderson et al. | 431—94 |

FOREIGN PATENTS

| G. 990,537 | 4/1965 | Great Britain | 431—94 |
| 1,935,287 | 1/1971 | Germany | 156—86 |
| 883,585 | 11/1961 | Great Britain | 264—92 |

CHARLES E. VAN HORN, Primary Examiner

F. FRISENDA, Jr., Assistant Examiner

U.S. Cl. X.R.
156—213, 214, 287, 289, 294, 303.1